(No Model.)
C. W. SMART.
ADJUSTABLE SUPPORT FOR BICYCLES.
No. 495,914. Patented Apr. 18, 1893.
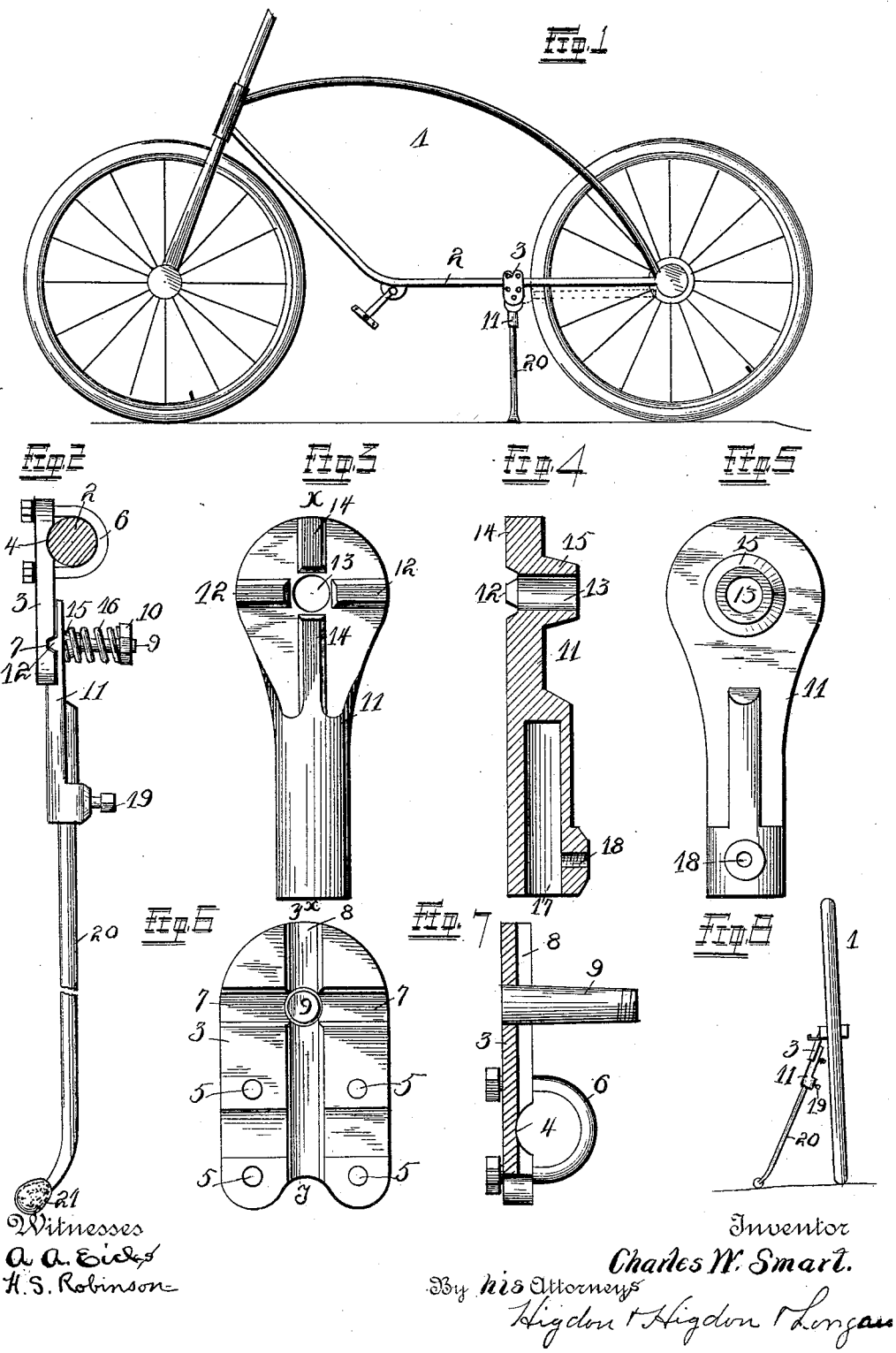
Witnesses
A. A. Eicks
H. S. Robinson
Inventor
Charles W. Smart.
By his Attorneys
Higdon & Higdon & Longan

UNITED STATES PATENT OFFICE.

CHARLES W. SMART, OF CARBONDALE, ILLINOIS.

ADJUSTABLE SUPPORT FOR BICYCLES.

SPECIFICATION forming part of Letters Patent No. 495,914, dated April 18, 1893.

Application filed April 12, 1892. Serial No. 428,826. (No model.)

*To all whom it may concern:*

Be it known that I, CHARLES W. SMART, of the city of Carbondale, Jackson county, and State of Illinois, have invented certain new and useful Improvements in Adjustable Supports for Bicycles, of which the following is a full, clear, and exact description, reference being had to the accompanying drawings, forming a part hereof.

My invention relates to a device for supporting bicycles when not in use, and consists in the novel construction, combination and arrangement of parts hereinafter set forth and pointed out in the claims.

In the drawings, Figure 1, is a broken side elevation of a safety bicycle having my invention applied thereto. Fig. 2, is an enlarged edge view of the improved support, with parts in section. Fig. 3, is an enlarged detail view of a movable locking-jaw, showing the front face thereof. Fig. 4, is a section view to the device shown in Fig. 3, the section being taken on the line $x\,x$ of said figure. Fig. 5, is an enlarged detail view of the movable locking-jaw, showing the face thereof which is opposite that shown in Fig. 3. Fig. 6, is a detail view of the inner side of the stationary locking-jaw, inverted. Fig. 7, is a detail sectional edge view of the device shown in Fig. 6, the section being taken on line $y\,y$ of said figure, and Fig. 8, represents an end view of a safety bicycle, illustrating the practical application of the device in supporting the bicycle.

My invention is especially applicable to what are commonly known as "safety" bicycles, and its object is to provide a simple, light and strong support, which is permanently attached to and carried by some stationary portion of the bicycle frame near the ground, and which may be quickly thrown downward into contact with the ground when desired for use and quickly thrown upward out of contact with the ground and located in a position substantially parallel with some stationary portion of the frame, preferably one of the horizontal arms of the rear fork, when not in use.

The function of the improved device is to temporarily support the bicycle when not in use, whether upon the road, in a street, or within a building, as will be more fully hereinafter set forth.

1, indicates an ordinary safety bicycle having the usual rear fork with a horizontal arm 2, located on each side of the rear wheel. 3, indicates a stationary clamping-jaw, removably secured to one of the horizontal arms 2 of the rear fork. The jaw 3, is provided on its rear face, adjacent its upper end, with a horizontal notch or depression 4, which is adapted for contact with said horizontal arm of the rear fork, and said jaw is further provided with a series of perforations 5, through which the free ends of staples 6, are passed and provided with screw threads and nuts, for clamping said jaw in place upon said arm, and firmly securing same at the desired position. This construction is such that the jaw 3, may be moved either forward or to the rear upon the arm of the rear fork. The jaw 3, is also provided with a horizontal depression 7, in its rear face, and a vertical groove or depression 8, each of which depressions have diverting or inclined side walls.

9, indicates a pivot, bolt or stud, which has its outer end secured to the jaw 3, preferably at the intersection of the depressions 7 and 8, and said bolt or stud 9 has its inner end screw threaded and provided with one or more nuts 10, for the purpose hereinafter mentioned.

The movable locking-jaw 11, is hinged or pivotally attached to the stationary jaw 3, in a manner now to be described. 12 indicates horizontal projections located upon or formed integrally with the outer face of the pivoted jaw, one on either side of a central opening or bore 13, and in alignment with each other. 14, indicates a series of two or more vertical projections disposed one on either side of the central opening 13. The projections 12 and 14 are each provided with converging or inclined sides, and are disposed in a manner corresponding to the position of the depressions 7 and 8 in the jaw 3, so that when the two jaws are relatively located as shown in Fig. 2, the projections 12 and 14 will register with and fit into the depressions 7 and 8, and lock the movable jaw to the stationary jaw in either of two positions of the latter, hereinafter mentioned. A boss or flange 15 projects from the inner face of the jaw 11, surrounds the bore 13, and is provided with a conical outer surface. A spring 16 is mounted upon the pivot or stud 9 between the boss 15 and the nut 10, and is adapted to yieldingly urge the movable jaw into contact with the stationary jaw during operation of the invention. The spring 16 may, of course be in form of a spiral, made of metal, or it may be in any other suitable form and made of other proper material for the purpose. Formed in the lower end of the jaw 11 is a socket or recess 17, into the rear side of which a screw threaded passage 18 opens, in which latter a set screw 19 is fitted, and the purpose of said socket is to receive the upper end of an adjustable rod 20. The lower end of this rod 20 is preferably provided with a pad or foot 21 of soft or pliable material, such as rubber.

The operation is as follows: The stationary jaw 3 is first securely clamped in position upon one of the horizontal arms 2 of the rear fork of the bicycle, a sufficient distance forward of the rear axle to permit the lower end of the rod 20 to lie in an elevated position without projecting too far rearward, as clearly shown in Figs. 1 and 2. The device is preferably located on the bicycle so that the rod 20, will project downwardly at an angle, so as to form and act as a brace, as indicated in Fig. 8. Normally, the rod 20 lies in a position parallel with and adjacent the horizontal arm 2 as shown by dotted lines in Fig. 1, and when the operator dismounts from his bicycle and desires to have it supported in a substantially upright position he grasps the rod 20, and presses it downward, until the lower end of same, or the pad 21, comes in contact with the ground, (see Fig. 1,) at which time the spring 16 will cause the projections 12 and 14 to spring into the depressions 7 and 8 of the stationary jaw, and securely lock the movable jaw to the stationary jaw, and the bicycle will be supported until the operator desires to use it again, when he will simply use one foot or his hand and elevate the rod 20 to its normal position, before stated, where it will lie securely without rattling, and entirely out of the way of the operator's feet or clothing.

The merits and advantages of this improved device will be readily perceived by the practical bicycle rider, and need not be further stated herein. The rod 20 may be quickly adjusted up or down, to suit different sizes of wheels, by means of the set screw 19. All the parts, 3, 11 and 9 may be very cheaply constructed of cast metal, so that the device may be produced at a very reasonable cost.

What I claim is—

1. In a bicycle support, the combination, with a rigid member 3 provided with an integral stud 9 having a threaded outer end, and with grooves 7 and 8 located at right angles to each other and radiating from said stud, of a movable member 11 provided with ribs 12 and 14 opposing the grooves 7 and 8, a boss 15 at the opposite side of said member, and with a bore 13 extending through the latter and the boss and adapted to receive the stud 9, a nut 10 mounted on the outer end of said stud, a coil spring 16 encircling the boss and stud, and an adjustable rod 20 mounted on the member 11 and provided at its free end with a pliable pad or foot; substantially as and for the purpose set forth.

2. A bicycle support having a stationary jaw 3 provided with horizontal depressions 4 and 7 in one place, in combination with staples 6, for securing same to the bicycle frame, movable jaw 11 provided with opening 13, stud 9 passing through said opening 13, spring 16 mounted on said stud, nut 10 also mounted on said stud, and an adjustable supporting rod 20 adjustably secured to said jaw 11, substantially as set forth.

In testimony whereof I affix my signature in presence of two witnesses.

CHARLES W. SMART.

Witnesses:
ED. LONGAN,
JNO. C. HIGDON.